(12) United States Patent
Kendrick et al.

(10) Patent No.: US 7,459,861 B2
(45) Date of Patent: Dec. 2, 2008

(54) LAMP CONTAINING VOLTAGE CONVERSION CIRCUIT INCLUDING FORWARD/REVERSE HYBRID PHASE-CONTROL CLIPPING CIRCUIT

(75) Inventors: George B. Kendrick, Lexington, KY (US); Ernest C. Weyhrauch, Cookeville, TN (US); Matthew B. Ballenger, Lexington, KY (US)

(73) Assignee: OSRAM Sylvania Inc., Danvers, MA (US)

( * ) Notice: Subject to any disclaimer, the term of this patent is extended or adjusted under 35 U.S.C. 154(b) by 203 days.

(21) Appl. No.: 11/097,004

(22) Filed: Apr. 1, 2005

(65) Prior Publication Data
US 2005/0162102 A1    Jul. 28, 2005

(51) Int. Cl.
*H05B 37/02* (2006.01)
(52) U.S. Cl. .............. 315/209 SC; 315/209 T; 315/209 R; 315/224; 315/246
(58) Field of Classification Search ........... 315/194, 315/209 R, 247, 248, 209 SC, 209 T, 224, 315/225, 307–311; 323/237, 300, 320, 325
See application file for complete search history.

(56) References Cited

U.S. PATENT DOCUMENTS

| 3,275,922 | A | | 9/1966 | Meyer et al. ............... 321/15 |
| 3,869,631 | A | | 3/1975 | Anderson et al. ........... 313/217 |
| 4,480,211 | A | | 10/1984 | Eggers ................... 315/70 |
| 4,500,813 | A | | 2/1985 | Weedall .................. 315/276 |
| 4,893,063 | A | | 1/1990 | Pernyeszi ................ 315/307 |
| 4,922,155 | A | | 5/1990 | Morris et al. ............. 315/205 |
| 4,928,038 | A | * | 5/1990 | Nerone .................. 315/209 R |
| 5,519,311 | A | * | 5/1996 | Widmayer ............... 323/319 |
| 5,859,506 | A | | 1/1999 | Lemke .................. 315/308 |
| 6,208,090 | B1 | | 3/2001 | Skilskyj et al. ............ 315/360 |
| 6,445,133 | B1 | | 9/2002 | Lin et al. ................. 315/57 |
| 6,700,333 | B1 | * | 3/2004 | Hirshi et al. ............. 315/291 |

* cited by examiner

*Primary Examiner*—Tuyet Vo
(74) *Attorney, Agent, or Firm*—Carlo S. Bessone

(57) ABSTRACT

A lamp contains a lamp voltage conversion circuit which includes a forward/reverse hybrid phase-control clipping circuit that clips a load voltage and provides an RMS load voltage to the lamp. The phase-control clipping circuit has a time-based pulse source that triggers conduction of the phase-control clipping circuit independently of line voltage magnitude during time periods spanning polarity changes of the load voltage that are separated by intervals when conduction is not triggered.

6 Claims, 8 Drawing Sheets

LAMP CONTAINING VOLTAGE CONVERSION CIRCUIT INCLUDING FORWARD/REVERSE HYBRID PHASE-CONTROL CLIPPING CIRCUIT

BACKGROUND OF THE INVENTION

The present invention is directed to a power controller that supplies a specified power to a load, and more particularly to a voltage converter for a lamp that converts line voltage to a voltage suitable for lamp operation.

Some loads, such as lamps, operate at a voltage lower than a line (or mains) voltage of, for example, 120V or 220V, and for such loads a voltage converter that converts line voltage to a lower operating voltage must be provided. The power supplied to the load may be controlled with a phase-control clipping circuit that typically includes an RC circuit. Moreover, some loads operate most efficiently when the power is constant (or substantially so). However, line voltage variations are magnified by these phase-control clipping circuits due to their inherent properties (as will be explained below) and the phase-control clipping circuit is desirably modified to provide a (more nearly) constant RMS load voltage.

A simple four-component RC phase-control clipping circuit demonstrates a problem of conventional phase-control clipping circuits. The phase-controlled clipping circuit shown in FIG. 1 has a capacitor 22, a diac 24, a triac 26 that is triggered by the diac 24, and resistor 28. The resistor 28 may be a potentiometer that sets a resistance in the circuit to control a phase at which the triac 26 fires.

In operation, a clipping circuit such as shown in FIG. 1 has two states. In the first state the diac 24 and triac 26 operate in the cutoff region where virtually no current flows. Since the diac and triac function as open circuits in this state, the result is an RC series network such as illustrated in FIG. 2. Due to the nature of such an RC series network, the voltage across the capacitor 22 leads the line voltage by a phase angle that is determined by the resistance and capacitance in the RC series network. The magnitude of the capacitor voltage $V_C$ is also dependent on these values.

The voltage across the diac 24 is analogous to the voltage drop across the capacitor 22 and thus the diac will fire once breakover voltage $V_{BO}$ is achieved across the capacitor. The triac 26 fires when the diac 24 fires. Once the diac has triggered the triac, the triac will continue to operate in saturation until the diac voltage approaches zero. That is, the triac will continue to conduct until the line voltage nears zero crossing. The virtual short circuit provided by the triac becomes the second state of the clipping circuit as illustrated in FIG. 3.

Triggering of the triac 26 in the clipping circuit is forward phase-controlled by the RC series network and the leading portion of the line voltage waveform is clipped until triggering occurs as illustrated in FIGS. 4-5. A load attached to the clipping circuit experiences this clipping in both voltage and current due to the relatively large resistance in the clipping circuit.

Accordingly, the RMS load voltage and current are determined by the resistance and capacitance values in the clipping circuit since the phase at which the clipping occurs is determined by the RC series network and since the RMS voltage and current depend on how much energy is removed by the clipping.

With reference to FIG. 6, clipping is characterized by a conduction angle a and a delay angle θ. The conduction angle is the phase between the point on the load voltage/current waveforms where the triac begins conducting and the point on the load voltage/current waveform where the triac stops conducting. Conversely, the delay angle is the phase delay between the leading line voltage zero crossing and the point where the triac begins conducting.

Define $V_{irrms}$ as RMS line voltage, $V_{orms}$ as RMS load voltage, T as period, and ω as angular frequency (rad) with ω=2πf.

Line voltage may vary from location to location up to about 10% and this variation can cause a harmful variation in RMS load voltage in the load (e.g., a lamp). For example, if line voltage were above the standard for which the voltage conversion circuit was designed, the triac 26 may trigger early thereby increasing RMS load voltage. In a halogen incandescent lamp, it is particularly desirable to have an RMS load voltage that is nearly constant.

Changes in the line voltage are exaggerated at the load due to a variable conduction angle, and conduction angle is dependent on the rate at which the capacitor voltage reaches the breakover voltage of the diac. For fixed values of frequency, resistance and capacitance, the capacitor voltage phase angle ($θ_C$) is a constant defined by $θ_C$=arctan (−ωRC). Therefore, the phase of $V_C$ is independent of the line voltage magnitude. However, the rate at which $V_C$ reaches $V_{BO}$ is a function of $V_{irrms}$ and is not independent of the line voltage magnitude.

FIG. 7 depicts two possible sets of line voltage $V_i$ and capacitor voltage $V_C$. As may be seen therein, the rate at which $V_C$ reaches $V_{BO}$ varies depending on $V_{irrms}$. For RC phase-control clipping circuits the point at which $V_C$=$V_{BO}$ is of concern because this is the point at which diac/triac triggering occurs. As $V_{irrms}$ increases, $V_C$ reaches $V_{BO}$ earlier in the cycle leading to an increase in conduction angle ($α_2$>$α_1$), and as $V_{irrms}$ decreases, $V_C$ reaches $V_{BO}$ later in the cycle leading to a decrease in conduction angle ($α_2$<$α_1$).

Changes in $V_{irrms}$ leading to exaggerated or disproportional changes in $V_{orrms}$ are a direct result of the relationship between conduction angle and line voltage magnitude. As $V_{irrms}$ increases, $V_{orrms}$ increases due to both the increase in peak voltage and the increase in conduction angle, and as $V_{irrms}$ decreases, $V_{orrms}$ decreases due to both the decrease in peak voltage and the decrease in conduction angle. Thus, load voltage is influenced twice, once by a change in peak voltage and once by a change in conduction angle, resulting in unstable RMS load voltage conversion for the simple phase-control clipping circuit.

When the phase-control power controller is used in a voltage converter of a lamp, the voltage converter may be provided in a fixture to which the lamp is connected or within the lamp itself. U.S. Pat. No. 3,869,631 is an example of the latter, in which a diode is provided in the lamp base for clipping the line voltage to reduce RMS load voltage at the light emitting element. U.S. Pat. No. 6,445,133 is another example of the latter, in which transformer circuits are provided in the lamp base for reducing the load voltage at the light emitting element.

SUMMARY OF THE INVENTION

An object of the present invention is to provide a novel fixed phase hybrid phase-control power controller that converts a line voltage to an RMS load voltage independently of variations in line voltage magnitude.

A further object is to provide a novel phase-control power controller with a phase-control clipping circuit that performs phase-control clipping of a load voltage to provide an RMS load voltage, where a conduction angle of the phase-control clipping circuit is defined by a time-based pulse source that triggers conduction in the phase-control clipping circuit during time periods that span polarity changes of the load voltage and that are separated by intervals when conduction is not triggered.

A yet further object is to provide a novel phase-control power controller with a fixed phase forward/reverse hybrid phase-control clipping circuit that includes a transistor switch whose gate receives positive polarity signals from a time-based pulse source to cause the transistor switch to be ON during time periods that span from before to after polarity changes of the load voltage and to be OFF between the time periods so as to define the conduction angle for the phase-control clipping circuit.

A still further object is to provide a lamp with this power controller in a voltage conversion circuit that converts a line voltage at a lamp terminal to the RMS load voltage usable by a light emitting element of the lamp.

DESCRIPTION OF PREFERRED EMBODIMENTS

Figure 1:
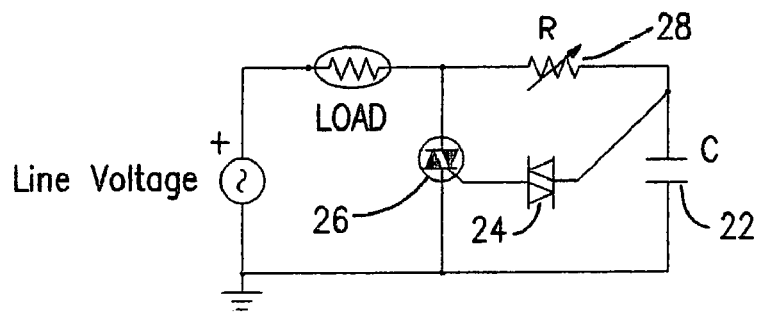
FIG. 1 is a schematic circuit diagram of a phase-controlled clipping circuit of the prior art.
Figure 2:
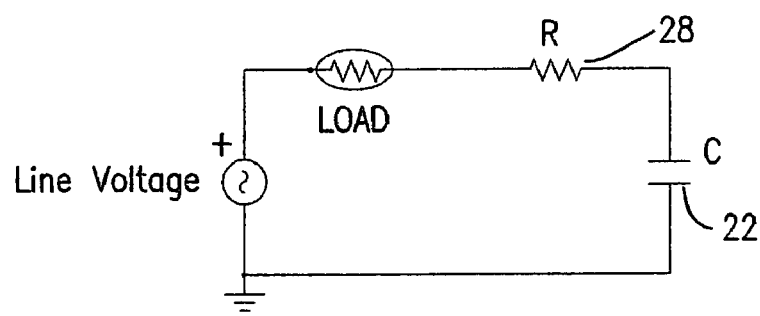
FIG. 2 is a schematic circuit diagram of the phase-controlled dimming circuit of FIG. 1 showing an effective state in which the triac is not yet triggered.
Figure 3:
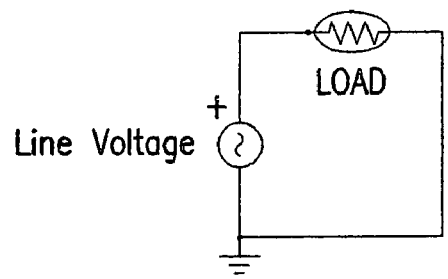
FIG. 3 is a schematic circuit diagram of the phase-controlled dimming circuit of FIG. 1 showing an effective state in which the triac has been triggered.
Figure 4:
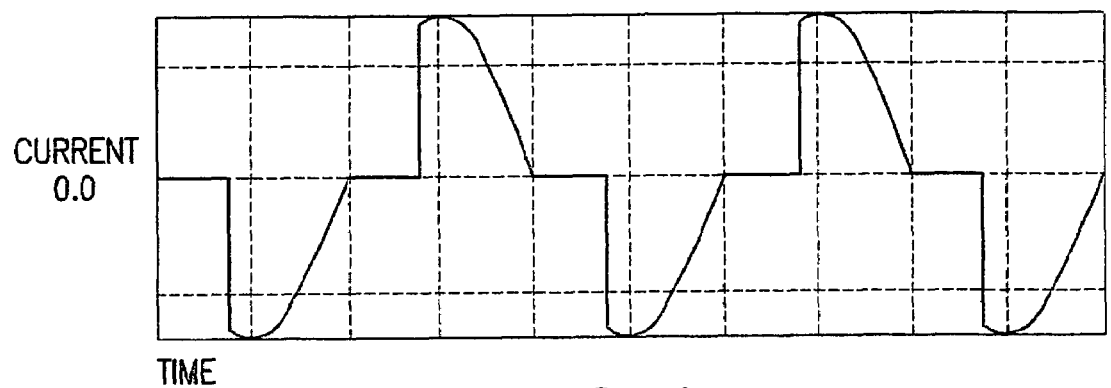
FIG. 4 is a graph illustrating current clipping in the phase-controlled dimming circuit of FIG. 1.
Figure 5:
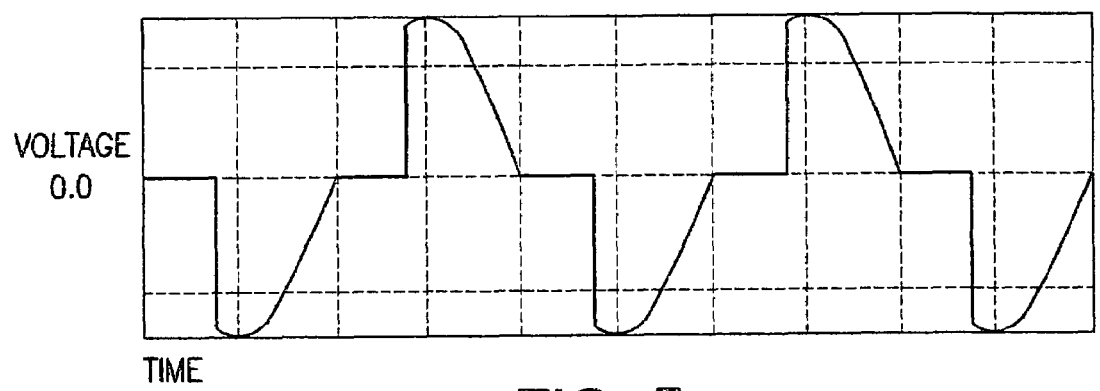
FIG. 5 is a graph illustrating voltage clipping in the phase-controlled dimming circuit of FIG. 1.
Figure 6:
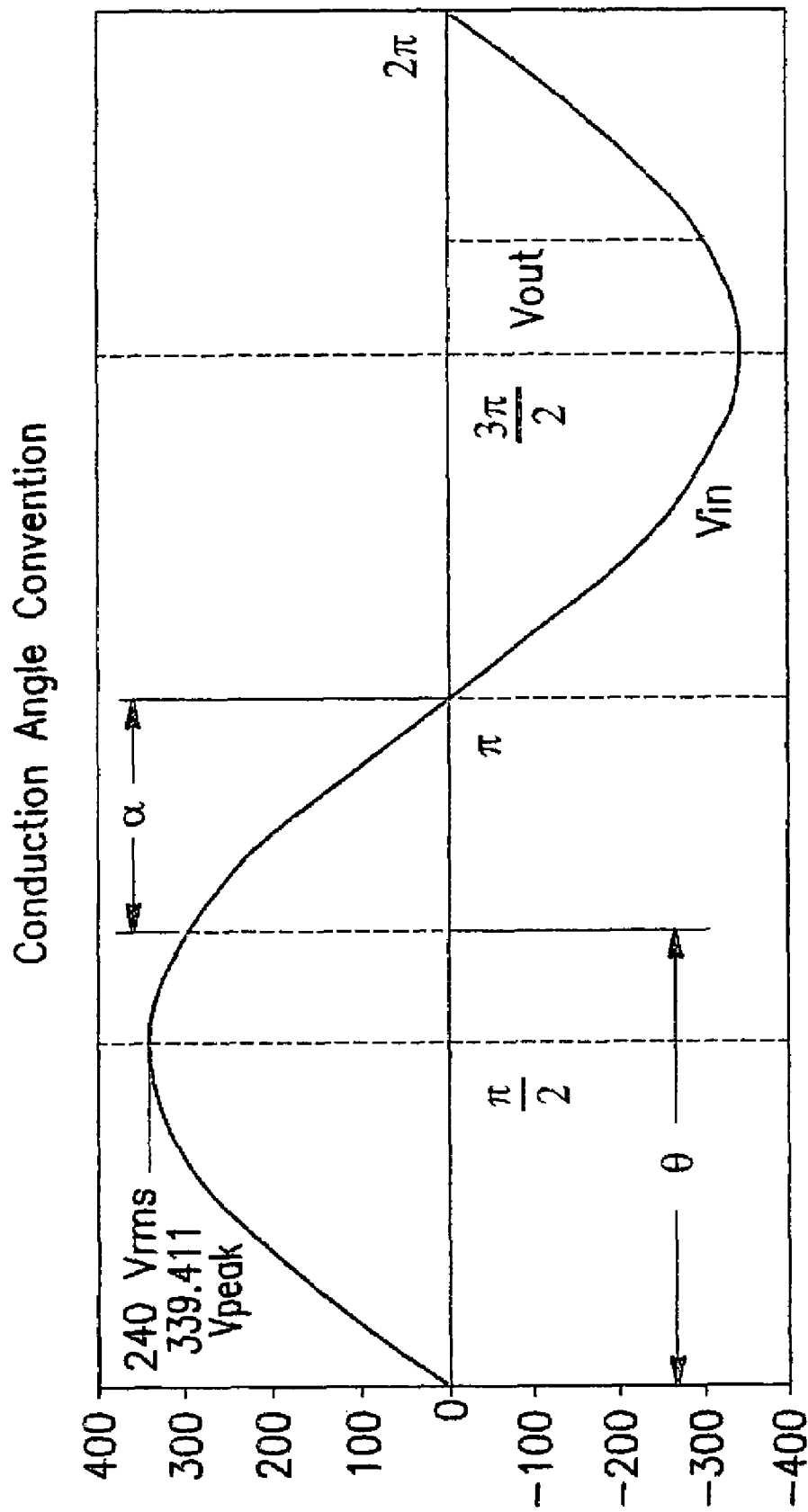
FIG. 6 is a graph showing the conduction angle $\alpha$.
Figure 7:
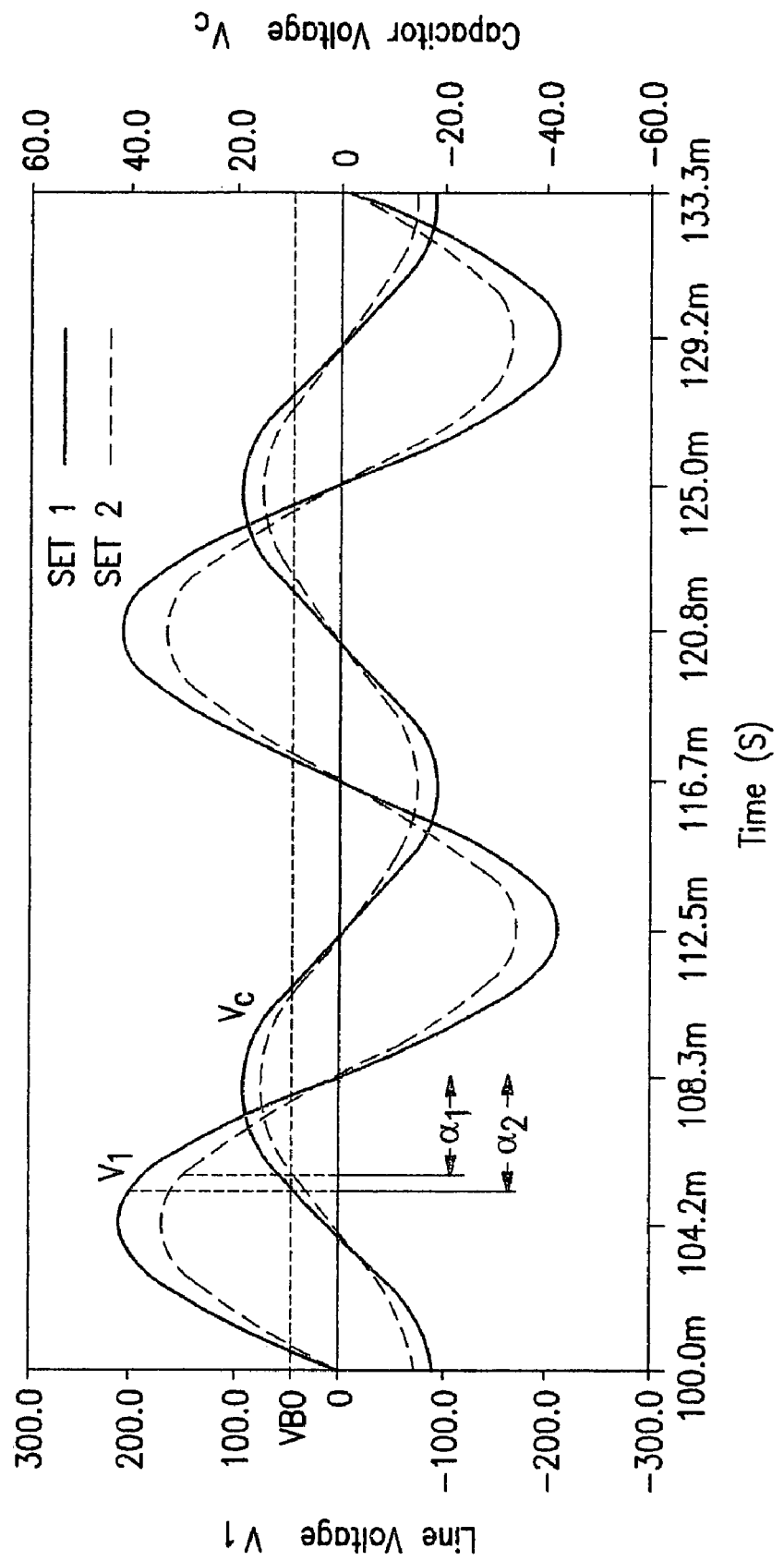
FIG. 7 is a graph showing how changes in the magnitude of the line voltage affect the rate at which capacitor voltage reaches the diac breakover voltage.
Figure 8:
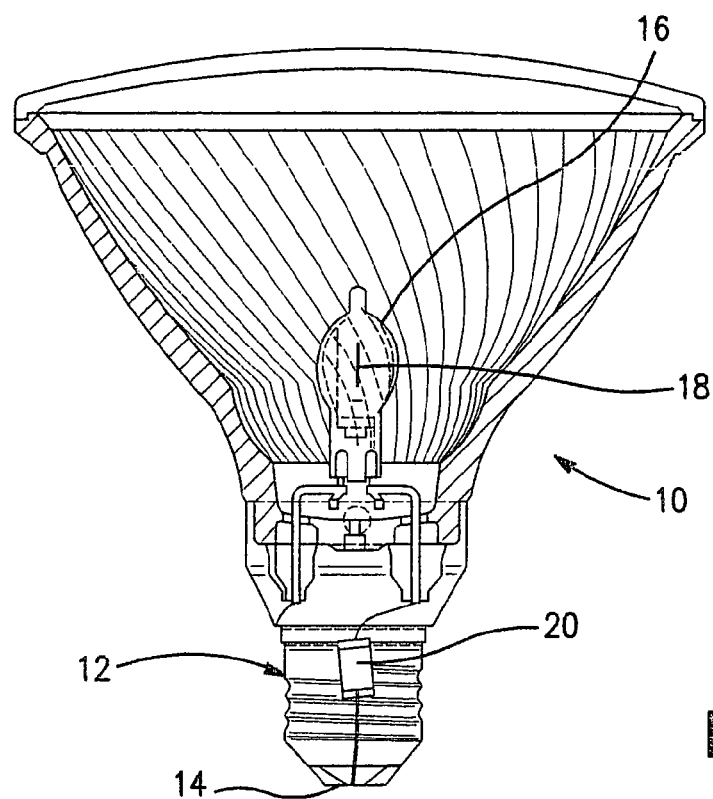
FIG. 8 is a partial cross section of an embodiment of a lamp of the present invention.

With reference to FIG. 8, a lamp 10 includes a base 12 with a lamp terminal 14 that is adapted to be connected to line (mains) voltage, a light-transmitting envelope 16 attached to the base 12 and housing a light emitting element 18 (an incandescent filament in the embodiment of FIG. 8), and a voltage conversion circuit 20 for converting a line voltage at the lamp terminal 14 to a lower operating voltage. The voltage conversion circuit 20 may be within the base 12 and connected between the lamp terminal 14 and the light emitting element 18. The voltage conversion circuit 20 may be an integrated circuit in a suitable package as shown schematically in FIG. 1.

While FIG. 8 shows the voltage conversion circuit 20 in a parabolic aluminized reflector (PAR) halogen lamp, the voltage conversion circuit 20 may be used in any incandescent lamp when placed in series between the light emitting element (e.g., filament) and a connection (e.g., lamp terminal) to a line voltage. Further, the voltage conversion circuit described and claimed herein finds application other than in lamps and is not limited to lamps.

Figure 9:
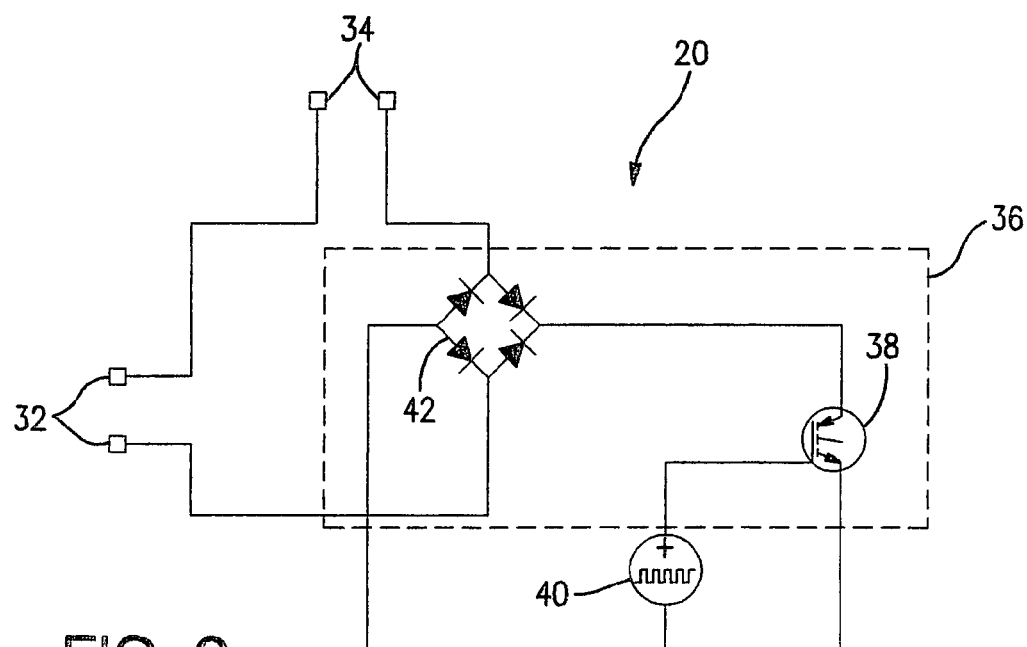
FIG. 9 is a schematic circuit diagram showing an embodiment of the fixed phase forward/reverse hybrid phase-control power controller of the present invention.

With reference to FIG. 9 that illustrates an embodiment of the present invention, the voltage conversion circuit 20 includes line terminals 32 for a line voltage and load terminals 34 for a load voltage, a fixed phase forward/reverse hybrid phase-control clipping circuit 36 that clips the load voltage and that is connected to the line and load terminals and has a transistor switch 38 wherein a conduction angle of the phase-control clipping circuit 36 determines an RMS load voltage, and a time-based signal source 40 that sends signals at constant time intervals to a gate of the transistor switch 38 that cause the transistor switch to be ON during time periods (shown in FIGS. 10-11) that span from before to after polarity changes of the load voltage and to be OFF between the time periods so as to define the conduction angle for the phase-control clipping circuit 36.

In other words, the voltage conversion circuit includes a fixed phase forward/reverse hybrid phase-control clipping circuit that clips a load voltage and provides an RMS load voltage to the lamp, where the phase-control clipping circuit has a time-based signal source that triggers conduction of the phase-control clipping circuit independently of line voltage magnitude during time periods spanning polarity changes of the load voltage that are separated by intervals when conduction is not triggered.

Conventional RC phase-control clipping circuits are very sensitive to fluctuations in the line voltage magnitude. The present invention provides a power controller that operates substantially independently of the line voltage magnitude by incorporating time-based pulses to trigger conduction, thereby reducing variation of the conduction angle compared to conventional RC phase-control circuits. Additionally, the time-based trigger makes it possible to use a forward/reverse hybrid of phase-control clipping by which the effects of electromagnetic interference (EMI) and total harmonic distortion (THD) are reduced in comparison to forward-only phase-control clipping.

Figure 10:
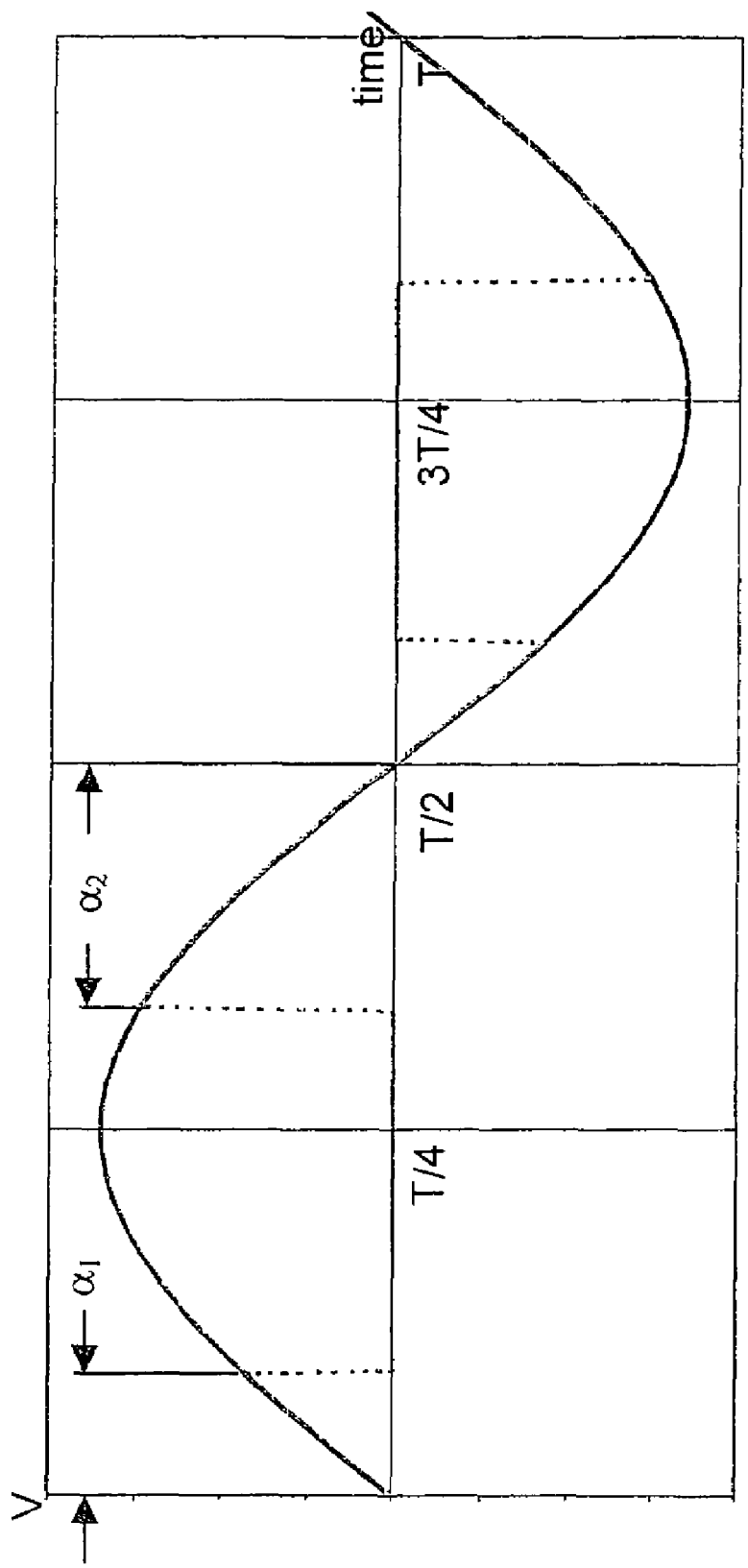
FIG. 10 is a graph depicting the hybrid clipping of the present invention, showing the conduction angle convention adopted herein.

With reference to FIG. 10, the forward/reverse hybrid clipping is defined as clipping that removes power from the region of the load voltage cycle near the peak of the cycle between polarity changes, without clipping the leading and trailing edges. That is, clipping occurs in the region shown in FIG. 10 between the conduction angle $\alpha_1$ and the conduction angle $\alpha_2$. As is apparent, together the two conduction angles $\alpha_1$ and $\alpha_2$ form a conduction region that spans a polarity change of the load voltage. The pulses sent to the transistor switch are timed to provide this hybrid clipping.

Figure 11:
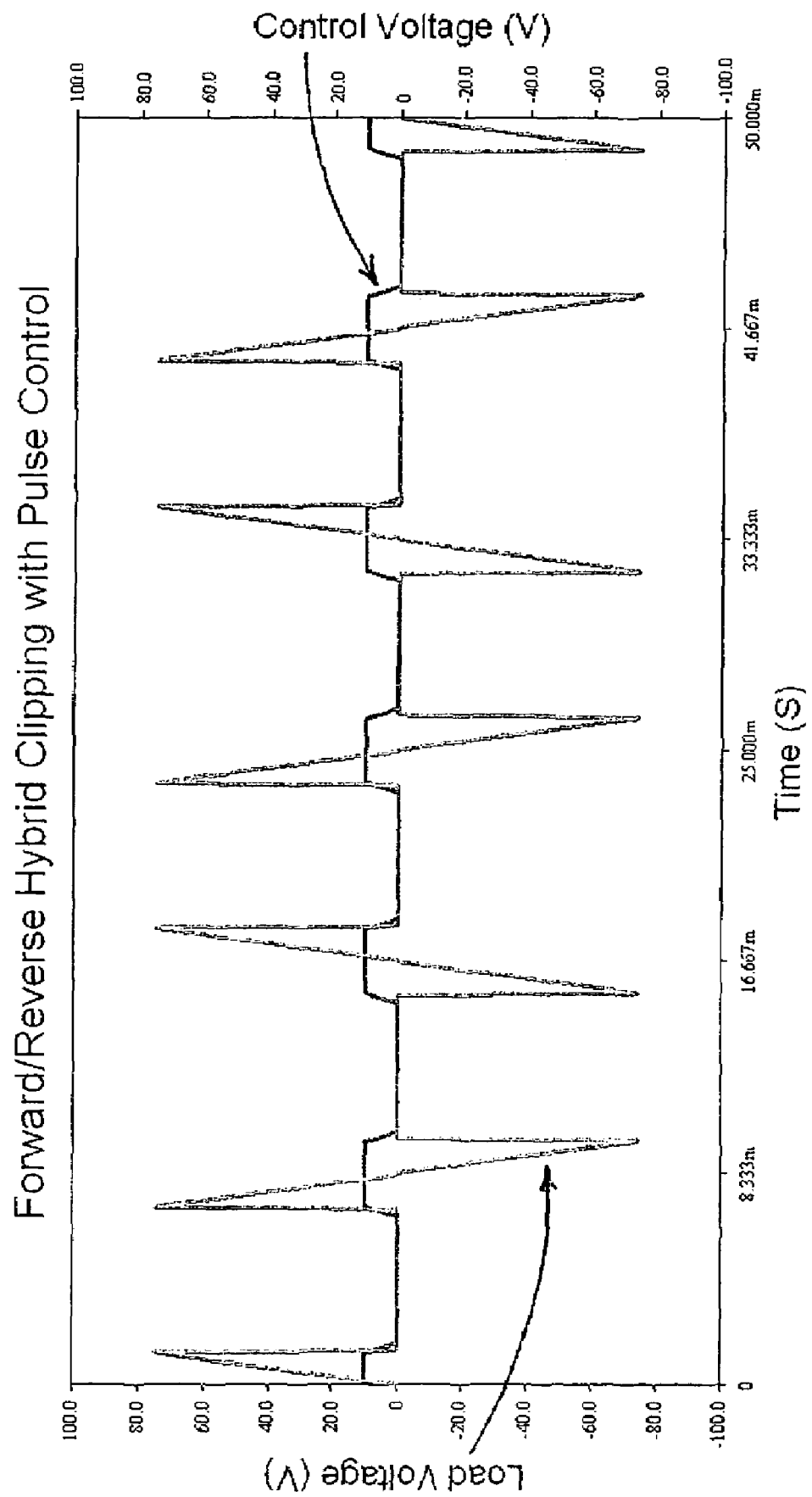
FIG. 11 is a graph depicting the hybrid clipping of the present invention, including the clipped load voltage and the pulse signal from the time-based signal source.

In particular embodiments, the phase-control clipping circuit 36 includes a full-wave bridge 42. In another embodiment the transistor switch 38 is an insulated gate bipolar transistor. The time-based signal source 40 may be any suitable signal source that sends signals at constant time intervals to a gate of the transistor switch 38, including a pulse generator, a microcontroller and a clock. The signals should have a positive polarity at the gate of the transistor switch to provide the hybrid clipping. Examples of waveforms of the pulse (control voltage) from the time-based signal source 40 and the hybrid clipped load voltage are shown in FIG. 11.

In operation, the time-based signal source 40 generates positive polarity pulses that are timed to coincide with the conduction regions (defined by conduction angles $\alpha_1$ and $\alpha_2$) of the power controller. The time-based signal source 40 sustains the pulses for the entirety of each period the transistor switch 38 is to be conducting. Some form of synchronization of the pulses with the load voltage waveform is also necessary (synchronization techniques being known and not the subject of the present application). As shown in FIGS. 10-11, the intervals when conduction in the circuit is not triggered include when the load voltage is at a peak of its cycle between adjacent polarity changes The conduction angles $\alpha_1$ and $\alpha_2$ are kept constant but may have values different from each other. Further, circuit harmonics may be manipulated while maintaining the desired power conversion by choosing different values for $\alpha_1$ and $\alpha_2$. For example, the designer of the power controller may choose to decrease the conduction angle $\alpha_1$ to achieve desired circuit harmonics and to increase conduction angle $\alpha_2$ to maintain the desired power conversion. Different ranges of harmonics can be selected to reduce EMI and THD.

Figure 12:
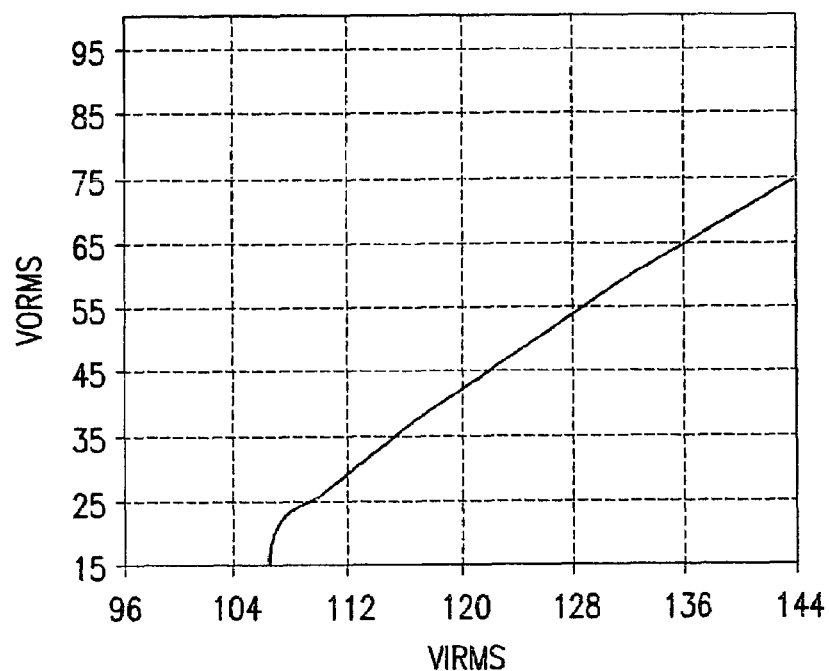
FIG. 12 is a graph of $V_{orms}$ versus $V_{irms}$ for a conventional RC phase-control power controller designed to produce 42 $V_{rms}$ output for 120 $V_{rms}$ input.
Figure 13:
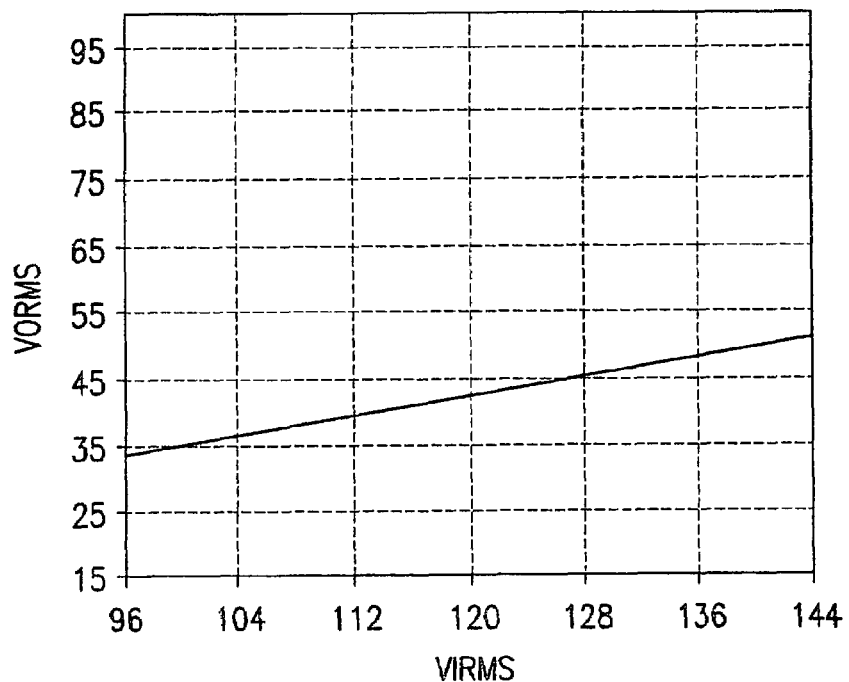
FIG. 13 is a graph of $V_{orms}$ versus $V_{irms}$ for a fixed phase forward/reverse hybrid phase-control power controller incorporating the present invention and designed to produce 42 $V_{rms}$ output for 120 $V_{rms}$ input.

FIGS. 12 and 13 illustrate the improvement afforded by the present invention. FIG. 12 shows relationship between $V_{orms}$ and $V_{irms}$ in a prior art RC phase-control clipping circuit, while FIG. 13 shows the relationship for the forward/reverse hybrid phase-control clipping circuit of the present invention. In each instance the circuit is designed to produce 42 $V_{rms}$ output for a 120 $V_{rms}$ input. Note that the output voltage varies considerably more in FIG. 12 than in FIG. 13.

The description above refers to use of the present invention in a lamp. The invention is not limited to lamp applications, and may be used more generally where resistive or inductive loads (e.g., motor control) are present to convert an unregulated AC line or mains voltage at a particular frequency or in a particular frequency range to a regulated RMS load voltage of specified value.

While embodiments of the present invention have been described in the foregoing specification and drawings, it is to be understood that the present invention is defined by the following claims when read in light of the specification and drawings.

What is claimed is:

1. A lamp comprising a lamp voltage conversion circuit within the lamp and connected to a lamp terminal,
   said voltage conversion circuit including a forward/reverse hybrid phase-control clipping circuit that clips a load voltage and provides an RMS load voltage to the lamp, said phase-control clipping circuit having a time-based pulse source that triggers conduction of said phase-control clipping circuit independently of line voltage magnitude during time periods spanning polarity changes of the load voltage that are separated by intervals when conduction is not triggered.

2. The lamp of claim 1, wherein the intervals when conduction is not triggered include when the load voltage is at a peak between adjacent polarity changes.

3. The lamp of claim 1, further comprising a base and a light-transmitting envelope, and wherein said voltage conversion circuit is within said base.

4. The lamp of claim 1, wherein said phase-control clipping circuit includes a transistor switch whose gate receives signals from said time-based pulse source to trigger conduction of said phase-control clipping circuit.

5. The lamp of claim 4, wherein said transistor switch is an insulated gate bipolar transistor.

6. The lamp of claim 4, wherein the signals have a positive polarity at the gate of said transistor switch.

\* \* \* \* \*